United States Patent
Kiyota

[11] Patent Number: 5,903,855
[45] Date of Patent: *May 11, 1999

[54] ACCELERATION SENSOR

[75] Inventor: Shigeyuki Kiyota, Kanagawa-ken, Japan

[73] Assignee: Nissan Motor Co., Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/760,252

[22] Filed: Dec. 5, 1996

[30]  Foreign Application Priority Data

Dec. 6, 1995  [JP]  Japan  .................................... 7-318245

[51] Int. Cl.$^6$ .................................................. G01P 15/00
[52] U.S. Cl. ........................ 702/86; 702/56; 364/528.15; 73/1.37; 73/662
[58] Field of Search ................ 364/566, 571.01–571.08, 364/528.15; 73/1.37, 1.38, 12.04, 488, 492, 503, 504.03, DIG. 10, 662–664, 35.09; 702/56, 86

[56]  References Cited

U.S. PATENT DOCUMENTS

| | | | |
|---|---|---|---|
| 4,464,725 | 8/1984 | Briefer | 702/99 |
| 4,843,555 | 6/1989 | Hattori et al. | 364/431.07 |
| 4,873,655 | 10/1989 | Kondraske | 702/86 |
| 5,000,030 | 3/1991 | Umeda et al. | 73/1 D |
| 5,012,428 | 4/1991 | Ueno et al. | 364/528.15 |
| 5,163,325 | 11/1992 | White et al. | 73/517 R |
| 5,337,260 | 8/1994 | Spangler | 364/571.02 |
| 5,353,642 | 10/1994 | Hasegawa et al. | 73/1.38 |
| 5,457,982 | 10/1995 | Spies et al. | 73/1 D |
| 5,726,361 | 3/1998 | Ogawa | 73/663 |

*Primary Examiner*—John Barlow
*Assistant Examiner*—Bryan Bui
*Attorney, Agent, or Firm*—Foley & Lardner

[57]  ABSTRACT

An acceleration sensor includes a sensing unit for detecting impact acceleration and a signal processing unit for measuring the magnitude of the detected acceleration. The signal processing unit has functions of calculating the sensitivity of the sensing unit when specific acceleration is applied to the sensing unit in an inspection stage, storing the calculated sensitivity, and correcting the output of the sensing unit according to the stored sensitivity in actual operation.

6 Claims, 1 Drawing Sheet

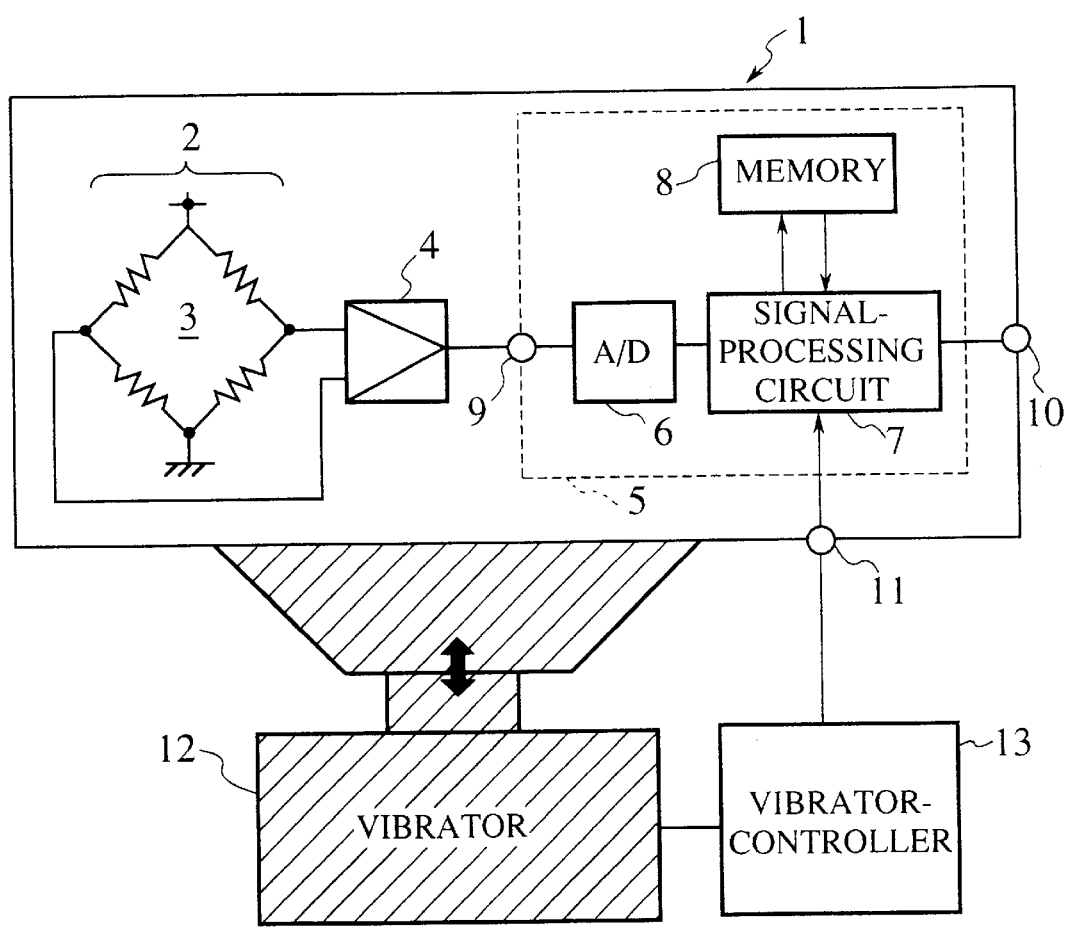
FIGURE

ACCELERATION SENSOR

BACKGROUND OF THE INVENTION

1. Field of the Invention

The present invention relates to an accelerometer used for a control system.

2. Description of the Prior Art

An acceleration sensor is used for a control system such as an automotive air-bag system. The acceleration sensor has a sensing unit, an amplifier connected to the sensing unit, and a signal processing unit. The sensing unit is a semiconductor piezoresistance sensing unit formed by etching a semiconductor substrate into a stationary part, a thin cantilever beam extending from the stationary part (semiconductor post), a weight supported by the beam, and a piezoresistance bridge formed on the beam. Acceleration applied orthogonally to the surface of the sensor produces stress on the beam. The stress is detected by the piezoresistance bridge circuit and is amplified by the amplifier. The output of the amplifier is processed by the signal processing unit, which has an A/D converter and a signal processing circuit.

The air-bag system employs the acceleration sensor to measure impact deceleration at a collision. The sensing unit provides a signal representing the impact deceleration, which is amplified by the amplifier. According to the amplified signal, the signal processing unit decides whether or not to deploy the air-bag, and provides an instruction signal to a controller for the air-bag inflater.

The signal supplied to the signal processing unit must correctly represent the detected impact acceleration (deceleration). To achieve this, the sensing unit must have a specified sensitivity. The sensing unit, however, usually involves an error in sensitivity. The error is corrected by adjusting the amplification factor of the amplifier. When the amplifier includes a preamplifier and an operational amplifier, the error is corrected by adjusting the ratio of the resistance of an input resistor to that of a feedback resistor of the operational amplifier. For this purpose, the amplifier is provided with an extra output terminal at, for example, the intermediate point between the preamplifier and the input resistor of the operational amplifier. The extra output terminal is used to measure the sensitivity of the sensing unit.

The prior art corrects the sensitivity of the sensing unit in two steps. "A sensitivity measuring step" employs a vibrator to apply specific acceleration to the sensing unit, and a sensitivity detector to measure the sensitivity of the sensing unit according to a signal from the extra output terminal of the amplifier, and measures sensitivity data by the sensitivity detector. "A sensitivity adjusting step" calculates an amplification factor according to the measured sensitivity data, selects an input resistor and a feedback resistor for the operational amplifier based on the calculated amplification factor, and installs the selected resistors in the amplifier. This acceleration sensor still involves various errors such as an error in the sensitivity detector and errors in the input and feedback resistors, and therefore, is not accurate.

Another prior art installs a memory in the signal processing unit of the acceleration sensor. The sensitivity of the sensing unit is measured and stored in the memory. In operation, the signal processing unit reads the sensitivity out of the memory and corrects the output of the sensing unit accordingly. To store the sensitivity data in the memory, this prior art must employ a manipulation with a vibrator to apply specific acceleration to the sensing unit, as well as a sensitivity detector to measure the sensitivity of the sensing unit according to a signal from the extra output terminal of the amplifier. This acceleration sensor, therefore, involves an error in the sensitivity detector.

SUMMARY OF THE INVENTION

An object of the present invention is to provide an accurate acceleration sensor, or accelerometer.

In order to accomplish the object, the present invention provides an acceleration sensor. The acceleration sensor 1 has a sensing unit 2 as sensing means for detecting acceleration (deceleration) and a signal processing unit 5 as signal processing means for storing a calculated sensitivity data, correcting output of the sensing unit 2, and measuring the magnitude of the acceleration. Specific acceleration is applied to the sensing unit 2 in advance, for example, during an inspection stage after the manufacturing of the acceleration sensor 1. The sensing unit 2 detects the specific acceleration and provides a corresponding signal according to which the signal processing unit 5 calculates and stores the sensitivity data of the sensing unit 2. In actual operation, the signal processing unit 5 corrects the output of the sensing unit 2 according to the stored sensitivity data, to always correctly measure acceleration. The signal processing unit 5 may have a writable memory 8 to store the calculated sensitivity data. Even if the sensing unit 2 involves an error in the sensitivity thereof, it is corrected so that the acceleration sensor may provide an output signal correctly representing applied acceleration in actual operation.

Other and further objects and features of the present invention will become obvious upon an understanding of the illustrative embodiment about to be described in connection with the accompanying drawing or will be indicated in the appended claims, and various advantages not referred to herein will occur to one skilled in the art upon employing of the invention in practice.

BRIEF DESCRIPTION OF THE DRAWING

FIGURE is a block diagram showing an acceleration sensor according to an embodiment of the present invention.

DETAILED DESCRIPTION OF THE EMBODIMENTS

An embodiment of the present invention will be described with reference to the drawing.

FIGURE is a block diagram showing an acceleration sensor 1 according to the embodiment of the present invention, as well as auxiliary equipment 12, 13 used to measure the sensitivity data of a sensing unit of the acceleration sensor. The acceleration sensor 1 is composed of the sensing unit 2 having a piezoresistance bridge circuit 3, an amplifier 4 for amplifying the output of the bridge circuit 3, and a signal processing unit 5. The sensing unit 2 is a semiconductor piezoresistance sensing unit formed by etching a semiconductor substrate such as silicon substrate into a stationary part (silicon post), a deflectable cantilever beam (or membrane) extending from the stationary part, and a weight supported by the beam. The bridge circuit 3 is formed on the beam. Acceleration applied vertically to the sensing unit 2 produces stress on the beam, and the bridge circuit 3 generates an analog signal in proportion to the stress. The signal is amplified by the amplifier 4. The signal processing unit 5 has an A/D converter 6, a signal processing circuit 7, and a nonvolatile writable memory 8. The A/D converter converts the amplified signal into a digital signal. The signal processing circuit 7 calculates or corrects the sensitivity data of the sensing unit 2 according to the digital signal. The memory 8 stores the calculated sensitivity data. The acceleration sensor 1 also has an output terminal 10 and an input terminal 11 for receiving an adjustment timing signal. A vibrator 12 is controlled by a vibrator-controller 13 and is used to measure the sensitivity of the sensing unit 2.

The acceleration sensor 1 is installed in, for example, a car air-bag system. In this case, the sensing unit 2 provides a signal representing impact acceleration, the amplifier 4 amplifies the signal, and the signal processing unit 5 decides whether or not to deploy an air-bag, and provides an instruction signal to an air-bag inflator (not shown).

Adjusting the sensitivity of the sensing unit 2 will be explained. In an inspection stage after manufacturing, the acceleration sensor 1 is set on the vibrator 12 as shown in FIGURE, and the vibrator-controller 13 drives the vibrator 12. When the vibrator 12 is stabilized to apply a specific acceleration to the acceleration sensor 1, the vibrator-controller 13 sends an adjustment timing signal to the terminal 11 of the acceleration sensor 1. In response to the timing signal, the signal processing unit 5 measures the level of a signal at a terminal 9 and divides the level by "a predetermined acceleration value" corresponding to the specific acceleration applied by the vibrator 12, to calculate the sensitivity data of the sensing unit 2. The predetermined acceleration value corresponding to the specific acceleration applied by the vibrator 12 is stored in the signal processing unit 5 in advance. The calculated sensitivity data is stored as a correction value in the memory 8.

In actual operation (for example, on the road), the signal processing unit 5 reads the correction value out of the memory 8 and corrects the output of the sensing unit 2 at the terminal 9. As a result, the output terminal 10 provides an output signal that correctly represents acceleration detected by the sensing unit 2. The signal from the output terminal 10 is used to determine whether or not the air bag must be deployed.

Unlike the prior art, the present invention requires no high-precision measuring equipment to measure the sensitivity of the sensing unit 2, nor the adjustment of resistors (input and feedback resistors) of the operational amplifier in the amplifier connected to the sensing unit. Accordingly, the present invention never involves errors related to measuring and adjusting the sensitivity of the sensing unit 2, and therefore, the acceleration sensor of the present invention is accurate. In addition, the present invention needs no system for transferring measured sensitivity data from the sensitivity measuring step to the sensitivity adjusting step. Although the present invention must have the nonvolatile writable memory 8, this may not increase the number of parts or costs of the acceleration sensor 1 because the memory 8 may be a part of a memory that is usually provided for the air-bag system.

The sensing unit 2 of the present invention is not limited to the semiconductor piezoresistance sensor. It may be a capacitive sensor (a silicon capacitance accelerometer), a resonator composed of a vibration beam excited by some electrically energized force, or any other type of silicon physical sensor.

As explained above, the present invention applies a specific acceleration to an acceleration sensor in an inspection stage after manufacturing. A signal processing unit of the sensor calculates the sensitivity of a sensing unit of the sensor according to the applied acceleration and stores the calculated sensitivity data as a correction value. In actual operation, the signal processing unit corrects the output of the sensing unit according to the correction value. Unlike the prior art, the present invention needs no measuring equipment to measure the print-output of an amplifier of the acceleration sensor through the extra output terminal at the intermediate point in the amplifier. Namely, the acceleration sensor of the present invention never involves errors related to the measuring equipment. The signal processing unit of the acceleration sensor of the present invention has a writable memory to surely and easily store the correction value, so that the acceleration sensor may always provide a correct output even if the sensing unit involves an error.

Various modifications will become possible for those skilled in the art after receiving the teachings of the present disclosure without departing from the scope thereof.

What is claimed is:

1. An acceleration sensor comprising:
   (a) a sensing unit for detecting acceleration; and
   (b) a signal processing unit for calculating sensitivity data based on data output by the sensing unit, storing the calculated sensitivity data in advance, and correcting the output of the sensing unit according to the stored sensitivity data in actual operation,
   wherein the sensitivity data is calculated by the signal processing unit with the detected acceleration having a predetermined value applied externally from a vibrator, in response to a timing signal sent from a vibrator-controller driving the vibrator, the sensitivity data being calculated by the signal processing unit in order for dividing a level of the data output by the sensing unit is divided by a predetermined acceleration value.

2. The sensor of claim 1, wherein the signal processing unit has a writable memory for storing the calculated sensitivity data.

3. The sensor of claim 1, wherein the predetermined acceleration value corresponds to the predetermined value of the detected acceleration.

4. An acceleration sensor comprising:
   a sensing unit;
   an A/D converter;
   a signal processing circuit for converting an output signal from the A/D converter to a desired signal and being configured to calculate sensitivity data based on the output signal;
   a writable memory; and
   an input terminal for receiving an adjustment timing signal,
   wherein the writable memory stores the sensitivity data during an inspection stage after manufacturing steps of the sensor, by inputting a predetermined acceleration to the sensing unit from a vibrator, inputting the adjustment timing signal from a vibrator-controller driving the vibrator to the input terminal, transferring an output signal level detected with the sensing unit to the A/D converter, and calculating the sensitivity data only with the signal processing circuit using the output signal converted by the A/D converter, the output signal level being divided by a predetermined value corresponding to the predetermined acceleration,
   wherein said signal processing circuit corrects the output signal from the sensing unit during actual operation of the sensor, by reading the sensitivity data stored in the writable memory, calculating the output signal from the sensing unit employing the sensitivity data.

5. A method of calibrating an acceleration sensor, comprising the steps of:

during an inspection stage, connecting a vibrating device to the acceleration sensor;

providing an amount of acceleration to the acceleration sensor by sending a first control signal from a vibration controller to the vibrating device;

providing a second control signal to the acceleration sensor which is indicative of the amount of acceleration provided to the acceleration sensor, the second control signal being provided to the acceleration sensor by the vibration controller;

detecting an acceleration by a detecting unit housed within the acceleration unit, and providing an output signal based on the detected acceleration;

computing, by a signal processing unit housed within the acceleration sensor, a sensitivity compensation value for the acceleration sensor based on the detected acceleration as given by the output signal and the amount of acceleration as given by the second control signal; and storing the sensitivity compensation value in a memory housed within the acceleration sensor to be used to determine an actual amount of acceleration detected by the acceleration sensor during normal operation of the acceleration sensor, wherein the sensitivity compensation value is used by the signal processing unit to eliminate any errors in the calibrating of the acceleration sensor that may be caused by differences between an actual amount of acceleration provided by the vibrating device and a commanded amount of acceleration that is to be provided by the vibrating device under control of the vibration controller, the commanded amount of acceleration being a value corresponding to the first control signal.

6. The method of claim 5, further comprising the step of dividing a first acceleration level based on the output signal by a second acceleration level based on the second control signal, the dividing step being performed by the signal processing unit.

* * * * *